United States Patent Office 2,886,599
Patented May 12, 1959

2,886,599

PROCESS FOR THE PRODUCTION OF BORON ALKYLS

Roland Köster, Mulheim-Ruhr, Germany, assignor to Studiengesellschaft Kohle m.b.H., Mulheim-Ruhr, Germany No Drawing. Application February 20, 1957
Serial No. 641,268

Claims priority, application Germany February 21, 1956

11 Claims. (Cl. 260—606.5)

This invention relates to a process for the production of boron alkyls.

For the production of boron trialkyls, almost the only method so far proposed has been the reaction of boron fluride with Grignard type magnesium compounds. Various boron trialkyls have already been produced in this manner, but so far no trialkyls higher than about boron tripentyl have been obtained. The reason for this limited knowledge of boron trialkyls may in the first place be that so far no technical uses have been proposed for these compounds, but may also be that the higher organic halogen compounds which are needed as starting materials for the production of the Grignard type magnesium compounds are not directly and conveniently available in the desired quantities, but must always first be produced from the corresponding alcohols, a reaction which generally does not take place on a technical scale.

It has now been found that boron alkyls with a very wide range of different alkyl radicals can be produced very easily if there is available in the first place any other boron alkyl in which the alkyl radical contains more than two carbon atoms. At present it is prepared to produce this boron alkyl by the process proposed for the first time by E. Wiberg for the reaction of boron fluoride with an aluminium trialkyl (F.I.A.T., Reviews of German Science; Inorganic Chemistry, vol. I, page 228.), since aluminium alkyls have recently become readily available from aluminium, olefins and hydrogen (Experientia, Supplement II, page 274 et seq., 1955). By simply heating this initial boron alkyl with an olefin, the olefin corresponding to the alkyl radical originally present can be removed from the boron compounds. The olefin used for this displacement reaction attaches itself in the form of the corresponding alkyl radical to the boron. The reaction is explained by the following equation:

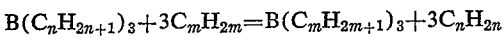

$$B(C_nH_{2n+1})_3 + 3C_mH_{2m} = B(C_mH_{2m+1})_3 + 3C_nH_{2n}$$

According to the present invention, boron alkyls are obtained by a process wherein boron alkyls having more than two carbon atoms in the alkyl radical are heated with olefins to at least 100° C.

This reaction makes it possible to produce all boron trialkyls, with the exception of boron trimethyl, for example from a boron tripropyl or a boron tributyl. Boron triethyl is less suitable as a starting material for this reaction, since ethylene is apparently removed only with great difficulty by foreign olefins. Conversely, however, boron triethyl can be produced by the process of the invention from a boron alkyl with a higher alkyl radical by reaction with ethylene.

The minimum temperature necessary for starting the reaction is 100° C., but the optimum temperature range is between 120 and 200° C. It is also possible to work at even higher temperatures, but then decomposition of the reaction products must be expected. The reaction is assisted by removing the olefin which is formed, this olefin generally being readily volatile, but this step is not absolutely necessary. For example, boron triisobutyl and ethylene are completely converted into boron triethyl and isobutylene, even in a closed vessel.

The reaction can also be carried out in an inert solvent, for example in an excess of the olefin being used as reagent. Examples of other solvents which are particularly suitable are saturated aliphatic and aromatic hydrocarbons, and ethers, especially high-boiling ethers.

The following examples further illustrate the invention.

*Example 1*

A 2-litre flask is provided with a stirrer device, a reflux condenser and above the latter a receiver cooled to −80° C. 272 g. (1.5 mols) of boron triisobutyl are placed in the flask under a nitrogen atmosphere and mixed with 1350 cc. (about 1000 g.)=7.15 mols of decene-1. The bath temperature is raised to 120–130° C. while stirring, evolution of gas (isobutene) beginning slowly. The bath temperature is raised slowly to 140–170° C. whereupon the gas, which can be condensed in the low temperature trap, is generated considerably more violently. The reaction is complete within 3–4 hours. The final bath temperature is 215° C. 240 g. (4.28 mols) of pure isobutene are obtained as condensate in the receiver; this corresponds to a conversion of more than 96% of the theoretical. The excess decene-1 is distilled off in a water jet vacuum, 375 g. (2.6 mols) being recovered. The residue consists of pure boron tri-n-decyl, which cannot be distilled without decomposition in a high vacuum.

Dodecene-6 can also be reacted with boron triisobutyl in a similar way to form boron tri-sec-dodecyl. The yield is practically quantitative.

The compounds obtained are identified as follows: an infra-red photograph no longer shows any of the olefinic starting material. When titrated with perbenzoic acid by the process of John R. Johnson and M. G. van Campen, Jr., Am. Soc. 60, 121–4 (1938), the boron trialkyls consume exactly three mols of perbenzoic acid per 1 mol of the expected compound. Moreover, autoxidation and subsequent hydrolysis of the mono-alkyl boric acid dialkyl ester which is obtained yields the corresponding alcohol.

*Example 2*

In an apparatus similar to that described in Example 1, a mixture of 28.6 g. (0.157 mol) of boron triisobutyl and 55.6 g. (0.47 mol) of α-methylstyrene is heated to 120–130° C., whereby isobutene begins to split off. The reaction is complete after approximately 3 hours, the temperature of the bath being slowly raised to a maximum of 200° C. 25.8 g. (0.48 mol) of isobutene (97.7% of the theoretical) are obtained, together with a residue consisting of an oily liquid, the titration value of which with respect to perbenzoic acid corresponds to the formula of the expected boron tri-(2-phenylpropyl).

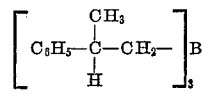

$$\left[ C_6H_5 - \underset{\underset{H}{|}}{\overset{\overset{CH_3}{|}}{C}} - CH_2 - \right]_3 B$$

*Example 3*

A mixture of 20.5 g. (0.146 mol) of boron tri-n-propyl and 98.5 g. (0.44 mol) of hexadecene-1 is heated to 140° C. while stirring in a 250 cc. flask (apparatus as in Example 1), the total amount expected (approximately 18 g.) of propene being split off within 4–5 hours if the mixture is heated towards the end of the reaction to a maximum temperature of 200° C. Boron trihexadecyl is obtained as residue.

Example 4

33 g. (0.18 mol) of boron tri-n-butyl are heated to 150–160° C. while stirring. 45 g. (0.546 mol) of cyclohexane are slowly added dropwise over a period of 15 to 18 hours to the said substance at a rate corresponding to the rate at which butene is split off, during which time the temperature in the reaction chamber (measured with an internal thermometer) is not allowed to fall below 150° C. The optimum internal temperature for the reaction is 160–170° C. 28.5 g. (0.51 mol) of n-butene are obtained at the end of the experiment. The residue solidifies after cooling and has a melting point of 114° C. The perbenzoic acid titration yields 2.97 m. mol of perbenzoic acid/m. mol of boron trialkyl (molecular weight: found 264, calculated 260).

Example 5

91 g. (0.5 mol) of boron triisobutyl are introduced under a nitrogen atmosphere into a 200 cc. autoclave. 45 g. (more than 1.5 mols) of ethylene are forced in under pressure (about 60 atm. gauge) and the autoclave is heated to 120–130° C., the pressure falling over a period of 10 hours to approximately 20 atm. gauge. After excess ethylene and a total of 82 g. (2.146 mols) of isobutylene have been blown off, a liquid is left which boils at 95–96° C. under normal pressure and is pure boron triethyl. Yield=47 g. (0.477 mol); this corresponds to 96% of the theoretical.

Example 6

141 g. (1.5 mols) of bicyclo-(2,2,1)-heptene-2 are slowly added dropwise over a period of 10–12 hours to a solution of 70 g. (0.5 mol) of boron tri-n-propyl in 300 cc. of dry decaline, this solution being heated under nitrogen to 160–170° C. 61 g. (1.45 mols) of propylene are obtained. The solvent is thereafter distilled off in a water jet vacuum. 145 g. of boron tri-bicyclo-(2,2,1)-heptyl- (M.P.=100/101° C.) are recovered as a residue, this yield being practically quantitative.

The boron alkyls produced by the process of the invention can be used as intermediates for organic syntheses.

What I claim is:

1. A process for the production of organic boron compounds, which comprises heating a boron lower alkyl containing more than 2 carbon atoms in the alkyl radical with an olefin having a different number of carbon atoms than the alkyl radical of said boron alkyl to at least 100° C. to thereby form an organic boron compound having a hydrocarbon radical corresponding to said olefin, replacing the alkyl radical of said boron alkyl.

2. A process according to claim 1, wherein said boron alkyl used as starting material is produced by reacting boron fluoride with an aluminium trialkyl.

3. A process according to claim 1, wherein said heating takes place to a temperature between 120 and 200° C.

4. A process according to claim 1, wherein the olefin formed is extracted during the reaction.

5. A process according to claim 1, wherein said heating takes place in the presence of an inert solvent.

6. A process according to claim 5, wherein a saturated aliphatic hydrocarbon is used as said inert solvent.

7. A process according to claim 5, wherein an aromatic hydrocarbon is used as said inert solvent.

8. A process according to claim 5, wherein an ether is used as said inert solvent.

9. A process according to claim 5, wherein an ether boiling at a relatively high temperature is used as said inert solvent.

10. A process according to claim 5, wherein an excess of the olefin to be reacted in the reaction mixture is used as inert solvent.

11. A process according to claim 1, in which said starting boron alkyl is a readily volatile boron alkyl and in which said heating is effected under pressure.

References Cited in the file of this patent

Lappert: Chemical Reviews, vol. 56, pp. 1051 and 1063 (1956).

Mikhailov et al.: Chem. Abstracts, vol. 51, p. 1026 (January 25, 1957).